United States Patent
Drapac et al.

(10) Patent No.: US 7,224,244 B2
(45) Date of Patent: May 29, 2007

(54) LINE-DOUBLER DELAY CIRCUIT

(75) Inventors: Michael J. Drapac, Coralville, IA (US); Nicolas J. Schaub, Cedar Rapids, IA (US)

(73) Assignee: Chelton, Inc., Lewisville, TX (US)

( * ) Notice: Subject to any disclaimer, the term of this patent is extended or adjusted under 35 U.S.C. 154(b) by 33 days.

(21) Appl. No.: 10/947,793

(22) Filed: Sep. 23, 2004

(65) Prior Publication Data

US 2006/0028294 A1    Feb. 9, 2006

Related U.S. Application Data

(60) Provisional application No. 60/599,746, filed on Aug. 6, 2004.

(51) Int. Cl.
  *H01P 5/12* (2006.01)
  *H01P 5/18* (2006.01)
  *H03H 9/36* (2006.01)

(52) U.S. Cl. ............... 333/109; 333/112; 333/138

(58) Field of Classification Search ......... 333/109, 333/110, 111, 112, 117, 12, 138; 343/853; 330/149
See application file for complete search history.

(56) References Cited

U.S. PATENT DOCUMENTS

| | | | | |
|---|---|---|---|---|
| 4,827,270 | A * | 5/1989 | Udagawa et al. | 343/853 |
| 6,127,889 | A * | 10/2000 | Myer | 330/149 |
| 6,188,373 | B1 * | 2/2001 | Martek | 343/893 |
| 6,714,072 | B2 * | 3/2004 | Kenington | 330/149 |

* cited by examiner

*Primary Examiner*—Dean Takaoka
(74) *Attorney, Agent, or Firm*—Jaeckle Fleischmann & Mugel, LLP (57) ABSTRACT

The length of a transmission line delay circuit is halved by inserting a directional coupler in the signal path ahead of the transmission line and either open circuiting or short circuiting the other end of the transmission line. The signal traveling through the directional coupler and through the transmission line is reflected back at the end of the transmission line, and the reflected signal is carried to the coupled output of the directional coupler. Since the signal travels through the transmission line twice, the delay time is doubled. Therefore, for a given delay requirement, the length of transmission line required is only half of the length required for prior art transmission delay lines.

1 Claim, 7 Drawing Sheets

LINE-DOUBLER DELAY CIRCUIT

This application claims the benefit of U.S. Provisional Application No. 60/599,746 filed Aug. 6, 2004.

BACKGROUND OF THE INVENTION

1. Field of the Invention

This invention relates to delay lines and, more particularly, to transmission line delay lines.

2. Description of Related Art

Transmission lines can be used as delay lines in many applications such as, for example, interference cancelling circuits used with radio transmitters and receivers, both fixed and mobile, and as delay lines in radar systems. In addition, such delay lines can also be used as signal storage media for sonar and electronic countermeasures equipment.

Radio transmission towers that simultaneously transmit and receive radio signals create interference in the received signals when the transmitter is transmitting. The method usual used to attenuate this interference is to sample the transmitted signal, invert the signal and add the inverted signal to the received signal to cancel out the interference.

While the interference arises from the coupling of the signal from the transmitting into the receiving antennas at the top of the tower, the circuitry to remove the interference is located at the base of the tower. Thus, the delay time for the signal to propagate from the transmitter up the tower to the transmitting antenna and back down again must be compensated for. Presently the signal delay is realized by passing the output signal from the transmitter through a length of transmission line that is approximately twice the height of the tower before the signal is inverted and added to the receiver input. The practical result is that a relatively large spool of costly cable sits at the base of the tower for each transmitter.

It can be appreciated that a circuit and method that can essentially half the length of cable required for transmission delay lines is highly desirable.

BRIEF SUMMARY OF THE INVENTION

In one aspect the present invention generally provides interference cancellation circuit that receives an interfering signal at an input terminal that is coupled to a port A of a directional coupler. A port B of the directional coupler is coupled to a first end of a transmission line, the other end of which is either open circuited or short circuited. A coupled output port C of the directional coupler passes a signal reflected from the open or short circuited end of the transmission line to a signal conditioning circuit. The signal conditioning circuit provides the delayed, conditioned compensating signal at an output terminal.

Yet another aspect of this invention is to provide a delay circuit having a directional coupler having a port A for receiving an input signal, a port B for outputting the signal a port A to a one end of a transmission line, the other end of which is either open circuited or short circuited. A coupled port C output terminal captures the signal entering port B and provides the delayed input signal.

A still further aspect of this invention is to provide a method for delaying a signal by passing the signal from port A through to port B of a directional coupler and into one end of a transmission line. The other end of the transmission line is either open circuited or short circuited causing the signal propagating from the directional coupler to be reflected back. An output port C captures the reflected signal that is essentially a delayed replica of the input signal.

OBJECTS OF THE INVENTION

It is, therefore, one of the primary objects of the present invention to provide a transmission line delay circuit which uses only half of the transmission cable used in conventional transmission line delay circuits.

Another object, of the present invention, is to provide a method of increasing the apparent directivity of the directional couplers used in the line-doubler delay line of the present invention.

Yet another object, of the present invention, is to provide a simplified method for fine adjusting the delay of the delay line.

In addition to the above-described objects and advantages of the present invention, various other objects and advantages will become more readily apparent to those persons who are skilled in the same and related arts from the following more detailed description on the invention, particularly, when such description is taken in conjunction with the attached drawing and appended claims.

It will be appreciated that for purposes of clarity and where deemed appropriate, reference numerals have been repeated in the figures to indicate corresponding features, and that the various elements in the drawings have not necessarily been drawn to scale in order to better show the features of the invention.

DETAILED DESCRIPTION OF THE PREFERRED EMBODIMENT

Figure 1:
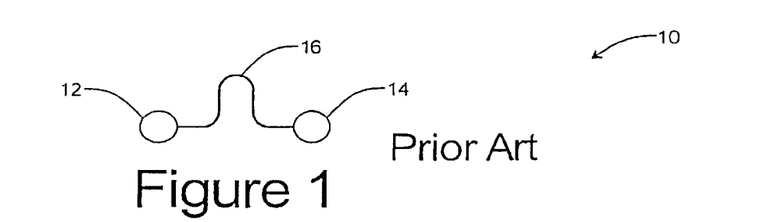
FIG. 1 is a schematic diagram of a prior art transmission line delay circuit.

Turning now to the drawings, FIG. 1 is a schematic diagram of a prior art transmission delay circuit shown generally as 10. A signal input at terminal 12 appears at output terminal 14 after the time required for the signal to propagate through the transmission line 16.

Figure 2:
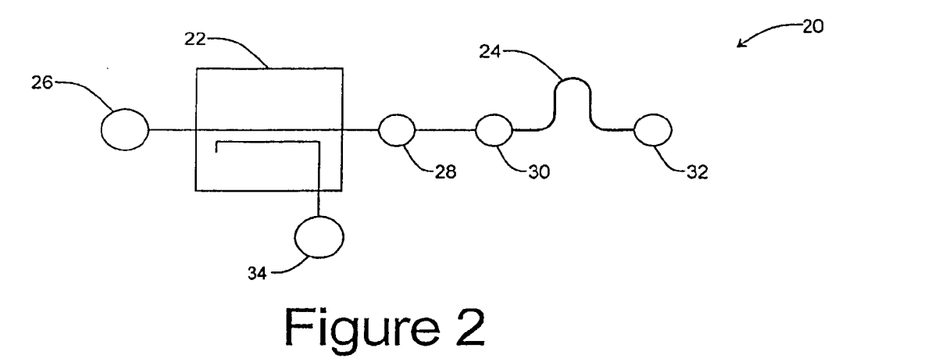
FIG. 2 is a schematic diagram of a line-doubler delay circuit according to the present invention.

FIG. 2 is a schematic diagram of an alternative delay line using the line-doubler delay circuit of the present invention, shown generally as 20. The line-doubler delay circuit is implemented using a directional coupler 22 connected to a transmission line 24. Significantly, the length of the transmission line 24 of the line-doubler 20 is only half the length of the transmission line 16 of FIG. 1 to achieve the same delay.

A signal applied to the input port 26 of the directional coupler 22 passes through the directional coupler 22 to a second port 28 and into a first end 30 of transmission line 24 to second end 32. Advantageously, the second end 32 of the transmission line 26 is open circuited or short circuited causing the signal to reflect back through the transmission line 24 and enter into the second port 28 of the directional coupler 22. A sample of the reflected signal is coupled onto a third port 34 of directional coupler 22.

Since the signal appearing at third port 34 travels from the first end 30 to the second end 32 of the transmission line 24 and back again, the total delay is twice the delay of a of a signal traveling in one direction only as occurs in the transmission line delay circuit of FIG. 1.

Figure 3:
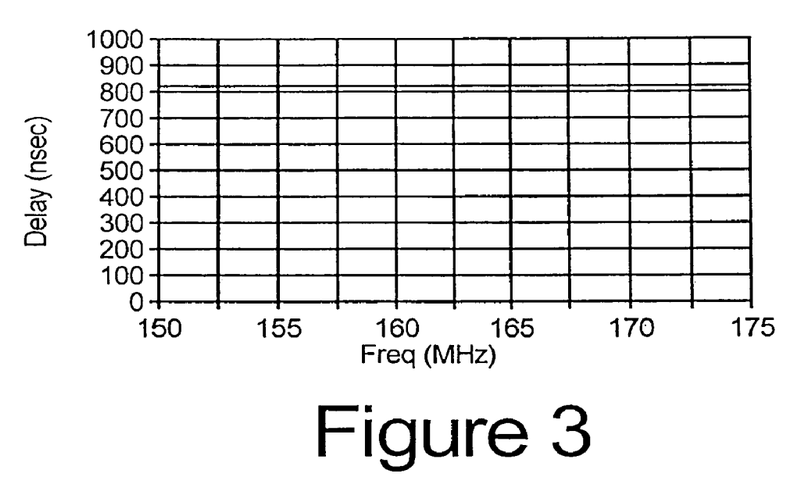
FIG. 3 is a graph of the calculated group delay of the transmission line delay circuit of FIG. 1.

FIG. 3 is a graph of the calculated group delay for the transmission line 16 of FIG. 1 having a length of one thousand feet. As shown in FIG. 3, the group delay is approximately 825 nsec from 150-175 MHz.

Figure 4:
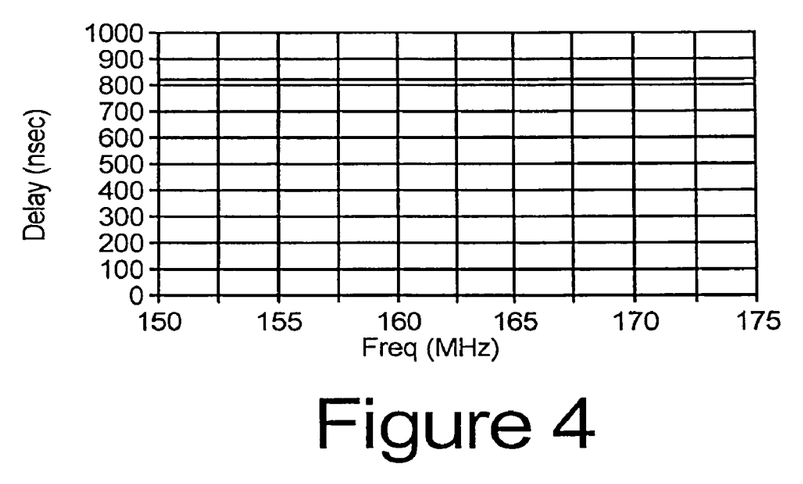
FIG. 4 is a graph of the calculated group delay of the line-doubler delay circuit of FIG. 2.

FIG. 4 is the same type of graph as FIG. 3 but for the line-doubler of FIG. 2. As shown in FIG. 4, the group delay is also approximately 825 nsec, but with a transmission line of only 500 feet.

Figure 5:
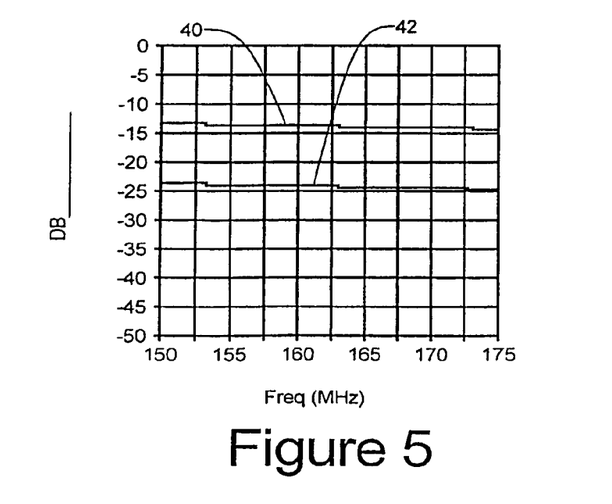
FIG. 5 is a graph of the measured insertion loss for the delay circuits of FIGS. 1 and 2.

FIG. 5 is a graph showing the measured insertion loss using the delay circuits of FIGS. 1 and 2. Line 40 is the insertion loss for the transmission line delay circuit of FIG. 1, and line 42 is the insertion loss for the delay circuit of FIG. 2.

Figure 6:
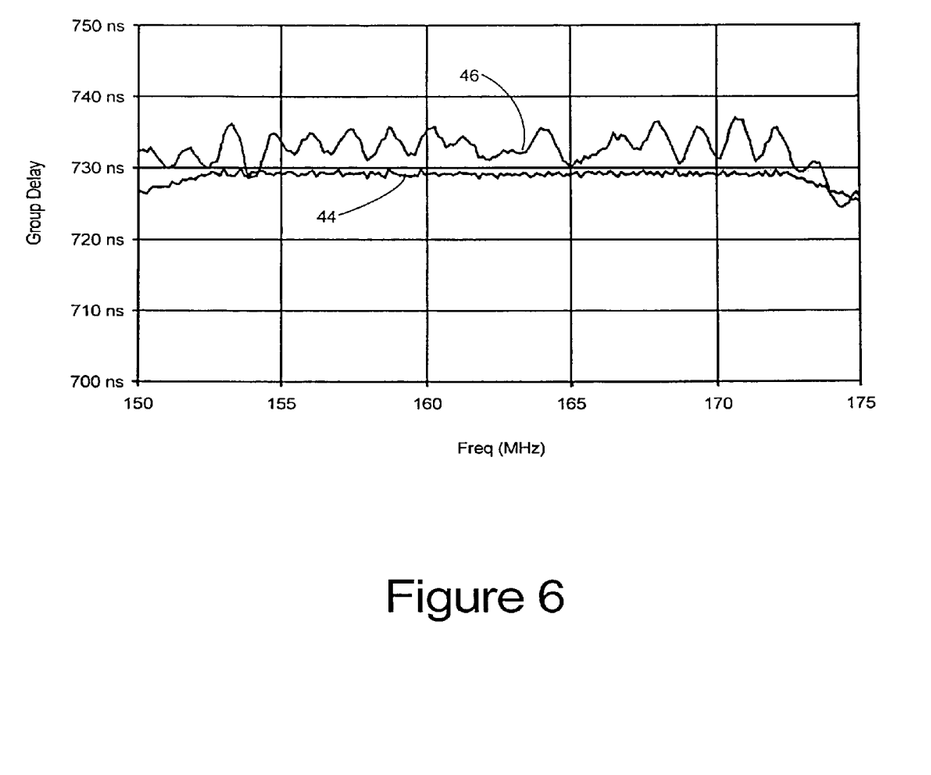
FIG. 6 is a graph of the measured group delay for the delay circuits of FIGS. 1 and 2.

FIG. 6 is the plot of the laboratory measurements of the group delay for a six hundred foot section of LMR-400 using the transmission line delay circuit of FIG. 1, shown as trace 44, and the plot for a three hundred foot section of LMR-400 using the line-doubler delay circuit of FIG. 2, shown as trace 46. The approximate group delay for both lines is 730 nanoseconds, and the variation in group delay between the two traces is at most 5 nanoseconds. The directional coupler used in the test was a model C6998-10 manufactured by Werlatone, Inc.

While the delay using the delay circuit of FIG. 2 is realized simply and effectively in half the physical length of the transmission line compared to the delay circuit of FIG. 1, some parameters must be considered prior to implementation. These parameters include insertion loss of the coupled port and adequate directivity to isolate the forward wave from the reflected wave of the delayed signal. This balancing of forward versus reflected waves is the primary concern in realization of the line-doubler delay. In most cases commercially available components possess adequate performance to satisfy the above requirements.

Figure 7:
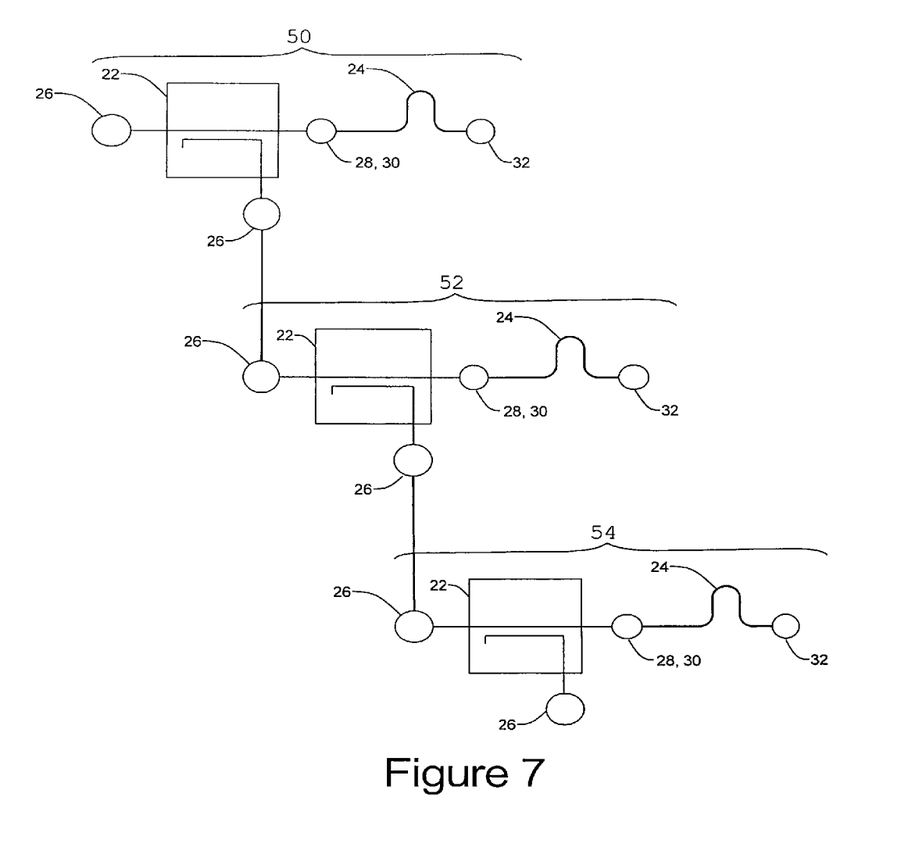
FIG. 7 is a cascaded arrangement of the line-doubler delay circuit of FIG. 2.

In cases where commercial components do not supply adequate directivity (typically <30 dB), an alternative approach is possible as shown in the schematic of FIG. 7. The use of multiple directional couplers, in the fashion detailed below, assists in reducing the directivity requirement and actually enabling the realization of extremely long delays with much shorter physical cable lengths.

As shown in FIG. 7, three line-doublers 50, 52, and 54 are cascaded or placed in series to provide a single delay. The use of multiple directional couplers assists in reducing the directivity requirements and actually enabling the realization of extremely long delays with much shorter physical cable lengths. The use of multiple line-doublers, with the shorter transmission lines reduces the loss in signal strength between the signal entering the directional coupler 22 at the input port 26 relative to the signal entering the second port 28 to thereby effectively enhance the overall directivity of the combined directional couplers 22.

For example, instead of using a single six hundred foot length of coax, three one hundred foot lengths would be required using the circuit of FIG. 7.

Figure 8:
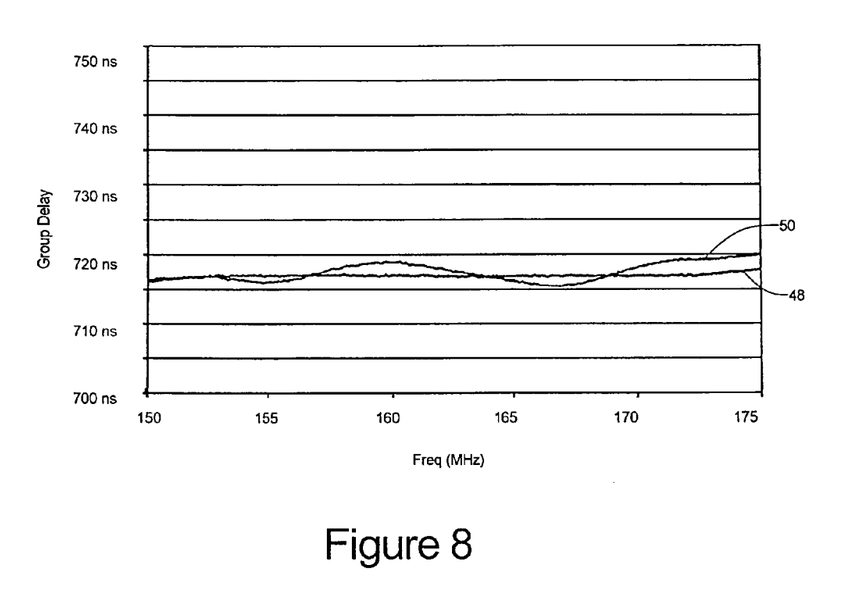
FIG. 8 is a graph of the measured group delay of the transmission line delay circuit of FIG. 1 and a two stage cascaded arrangement of the line-doubler delay circuit of FIG. 2.

FIG. 8, similar to FIG. 6, is a graph of the group delay for a fifty foot section of RG-223 using the circuit of FIG. 1, shown as trace 48. Trace 50 is the group delay for two line-doublers each with twelve and one-half foot sections of RG-223. The variation in group delay between the two traces is at most 5 nanoseconds.

Figure 9:
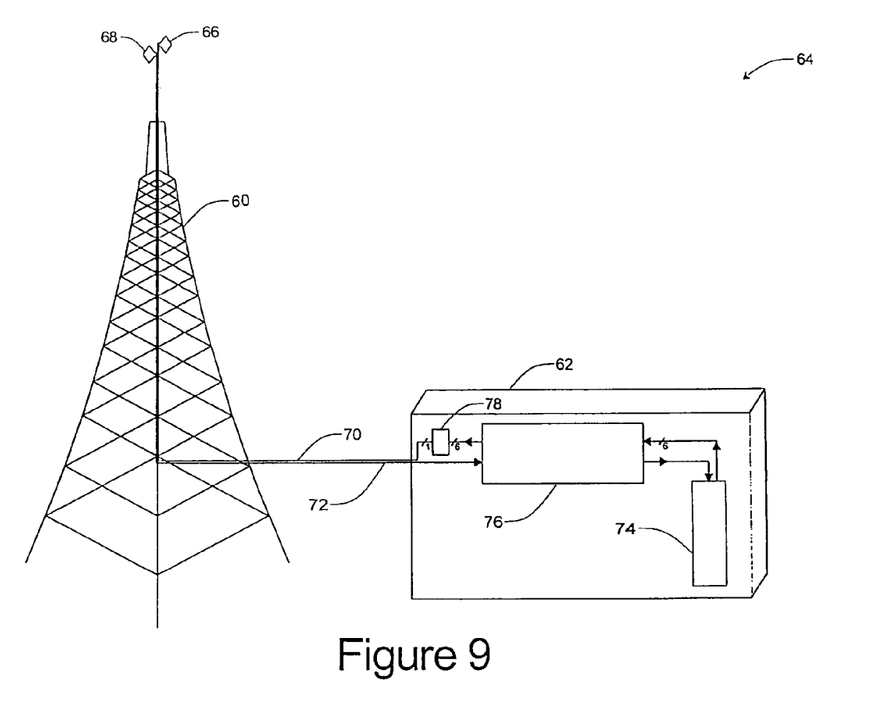
FIG. 9 is a block diagram of a radio tower with an accompanying shelter.

FIG. 9 is a pictorial schematic of a radio transmission tower 60 having a base station shelter 62 and shown generally as 64. The tower 60 has a transmitting antenna 66 and a receiving antenna 68 at the top of the tower 60. A transmitter cable 70 and a receiver cable 72 couple the antennas to six radios 74 in the shelter 62. Coupled between the transmission cables 70 and the six radios 74 is an interference cancelling circuit 76 and a signal combiner 78. The interference cancelling circuit 76 couples the receiver cable 72 to the six radios 74. The six transmission cables from the six radios are coupled through the interference cancelling circuit 76 to the signal combiner 78 that combines the six transmission signals and places the combined signal onto the transmitter cable 70. Alternatively, the signal combiner 78 can be located in the interference cancelling circuit 76.

The interference canceling circuit 76 cancels the interference due to the coupling of the signal from the transmitting antenna 66 into the receiving antenna 68.

Figure 10:
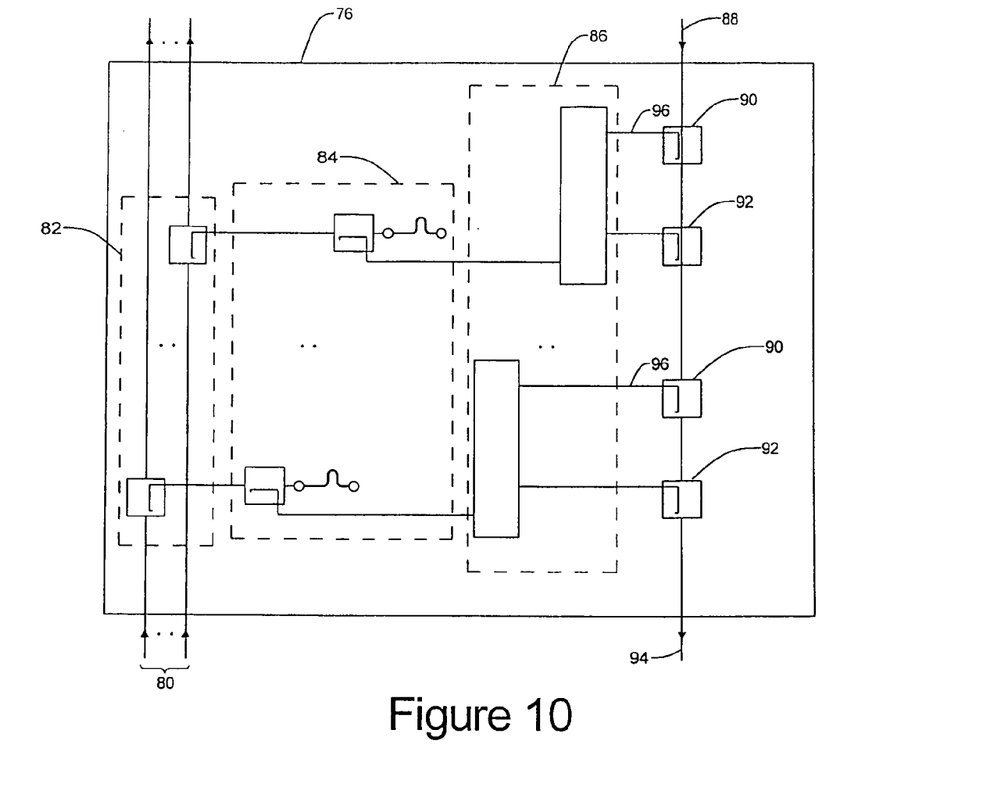
FIG. 10 is a block diagram of an interference cancellation circuit which includes the line-doubler delay of FIG. 2.

FIG. 10 is a block diagram of the interference cancelling circuit 76 of FIG. 9. As shown in FIG. 10 six transmitter input signals at input terminals 80 pass through six directional couplers 82 before passing to the six transmitter antennas 66. Each of the signals coupled from the six directional couplers 82 are passed to one of six line-doubler delay lines 84. The outputs of the six line doubler delay lines 84 are input to six weighting circuits 86.

The six signals at input terminals 88 from the six receiving cables 72 are each passed through a first directional coupler 90 and a second directional coupler 92 before passing through the six output terminals 94. An output 96 of each of the weighting circuits 86 is connected to the directional couplers 90 to inject the inverse of the six transmitter signals to thereby remove the transmitter interference. The sample output from the directional couplers 92 are input to the weighting circuits 86 and are used to adjust the amplitude and phase of outputs of the weighting circuits by techniques known in the art.

An additional benefit of the line doubler approach is the single-ended nature of the delay line. This means the delay is achieved from the input of the directional coupler to the coupled port of the directional coupler. The single-ended delay line can be stored or placed in a remote location with no requirement to return the cable to get the sample from the far end of the cable.

Lastly, the delay line can be trimmed at the far end by simply cutting off the end of the cable until the proper delay length is achieved. The far end, the open-circuited end, can be left unterminated, however, physically sealed or electrically capped if needed.

Although the invention has been described in part by making detailed reference to a certain specific embodiment, such detail is intended to be, and will be understood to be, instructional rather than restrictive. It will be appreciated by those skilled in the art that many variations may be made on the structure and mode of operation without departing from the spirit and scope of the invention as disclosed in the teachings contained herein.

We claim:

1. A method for delaying a signal comprising the steps of:
a) passing said signal into a port A through to a port B of a directional coupler, said directional coupler having a coupled output port C wherein a significant portion of a signal into said port B appears at said coupled output port C; and
b) passing said signal from port B into one end of a transmission line, the other end of which is one of open and short circuited;
c) wherein said coupled output port C provides said delayed signal.

* * * * *